Aug. 31, 1965 C. EYRAUD ETAL 3,203,086
PROCESS AND DEVICE FOR THE MANUFACTURE OF A PERMEABLE MEMBRANE
Filed Jan. 13, 1961
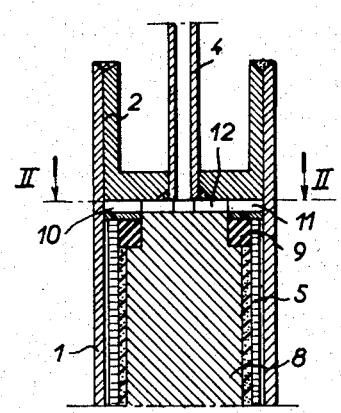
Fig.1
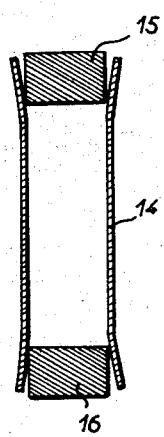
Fig.3
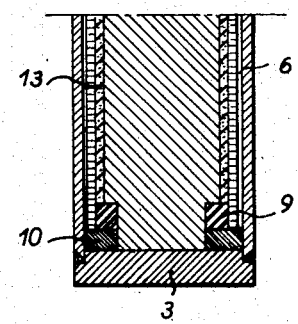
Fig.2
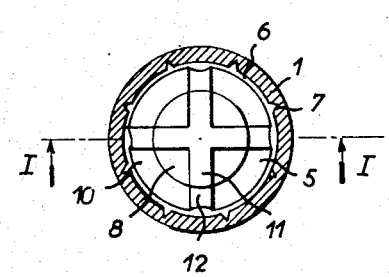
INVENTORS
CHARLES EYRAUD
GEORGES COUNAS
MICHEL EUDIER
DANIEL MASSIGNON
BY
Bacon & Thomas
ATTORNEYS

United States Patent Office 3,203,086
Patented Aug. 31, 1965

3,203,086
PROCESS AND DEVICE FOR THE MANUFACTURE OF A PERMEABLE MEMBRANE
Charles Eyraud, Lyon, Georges Counas, Le Plessis Robinson, Michel Eudier and Daniel Massignon, Paris, France, assignors to Commissariat a l'Energie Atomique, Paris, France
Filed Jan. 13, 1961, Ser. No. 82,491
Claims priority, application France, Jan. 23, 1960, 816,490
7 Claims. (Cl. 29—528)

This invention relates to a method of producing a permeable membrane by the application of a microporous metallic layer to a macroporous metallic support constituted by a hollow, thin-walled member, preferably a tube, and concerns more particularly the case where a microporous nickel layer is provided on cylindrical tubes of nickel, in order to form therewith barriers which can be used in separation techniques employing gaseous diffusion, for example when separating uranium isotopes by the diffusion of uranium hexa-fluoride.

The permeable membrane so produced can be employed in a number of other very diverse applications; for example, catalysis when the membrane itself forms a catalyst and non-isotopic gaseous separation, can be mentioned.

The apparatus hereinafter described for carrying out this method also forms part of the invention. The method and apparatus according to the invention give better results than known methods and apparatus to which they correspond, for providing a microporous metallic layer on a macroporous metallic support, as regards the various requirements occurring in practice, including mechanical strength, permeability and ease of production.

Accordingly, the method of the invention comprises providing a hollow marcoporous metallic support, having wall thickness from 0.2 to 1 mm. and a mean pore radius from $1\mu$ to several dozen $\mu$, with a layer on its internal face of a thickness from 0.05 to 1 mm. of a metallic compound admixed with a binding agent, which thermally dissociates into a finely divided metal with a particle size from 0.5 $c\mu$ to $0.5\mu$ and a volatile constituent, introducing into the coated support a rigid core with a polished external surface fitting the layer, introducing the assembly formed by the coated support and its core into a casing whose internal shape corresponds to the external shape of the support with a clearance of the order of 0.02 to 1 mm. between the support and the casing, sealing the casing in an air-tight fashion with the exception of at least one opening, and, while providing a vacuum or inert atmosphere, effecting thermal dissociation of the metal compound, eliminating the volatile constituent released by aspiration towards the opening, compressing the support and the sub-divided metal covering its internal surface, by means of a hydraulic pressure of 1 to 15 $t/cm.^2$ applied to the external surface of the casing, between the core and the casing applied by deformation of the support by the hydraulic pressure, maintaining the casing during application of the hydraulic pressure at a temperature between the ambient temperature and the sintering temperature of the metallic powder giving a closed porosity under the same conditions, and separating from the core and the casing the permeable membrane constituted by the the support covered by a microporous layer.

The core, the casing and the metallic support can be in the form of a cylinder, whether or not of revolution or of any other form, for example, conic or prismatic, allowing ready introduction of the parts into one another and at the end of the method, allowing ready withdrawal of the core and removal of the covered metallic support.

It should be noted that, to obtain certain metals, such as nickel or copper, in a finely-divided, readily sinterable form by compression at relatively low temperatures, simple thermal dissociation can be effected, under vacuum or an inert atmosphere, of certain compounds of these metals. For nickel, such compounds are, for example, the formate, oxalate, alcoholate, chelate and nickel carbonate, and nickel carbonyl.

Moreover, it is known, in order to obtain a diffusion barrier of given pore radius (2 $c\mu$ for example), that it is better to apply a relatively high pressure to particles or crystallites or relatively large dimensions (10 $c\mu$ for example) than to apply a smaller pressure to smaller particles or crystallites; in fact, the surfaces presented by groups of the latter particles are greater than groups of the former and their capacity for retaining gases to be diffused is higher.

The state of sub-division of the metallic powders obtained by thermal dissociation of the compounds mentioned above is sufficiently fine so that suitable diffusion barriers can be made from these powders merely by subjecting them once to an elevated pressure at a relatively moderate temperature.

It is a phenomenon of this kind with which the present invention is concerned.

Referring to FIGURES 1 to 3 of the accompanying drawings, various embodiments of the invention are described below, by way of example only.

In the drawings:

FIGS. 1 and 2 show, respectively, an axial section along I—I of FIG. 2 and a transverse section along II—II if FIG. 1 of a device constructed in accordance with the invention for internally coating a microporous metallic layer on to a macroporous metallic tube.

FIG. 3 shows an axial section of a casing provided with means for closing in a sealed manner, consisting of a modification of the closing means of the casing of FIGS. 1 and 2.

The device shown in FIGS. 1 and 2 comprises a casing or cylindrical container 1, the interior of which can be sealed by brazing on two plugs 2 and 3 at this axial extremities.

A pipe 4 traversing the plug 2 can be connected to an aspirating pump (not shown) to evacuate the casing 1.

The internal diameter of the casing 1 is slightly greater, by about 0.02 to 1 mm., than the external diameter of a metallic support to be covered and constituted by a metallic tube 5, such that the latter can be readily introduced into the casing with a slight clearance 6.

Longitudinal grooves or channels 7 can be provided in the interior wall of the casing 1 to facilitate pumping and to avoid creasing during the treatments mentioned below.

A cylindrical core 8 having a smooth exterior surface, the external diameter of which is substantially equal to the internal diameter of the tube 5 coated with the metallic layer, is put inside and rings 9 and 10 are provided to ensure sealing between the tube 5 and core 8 and location of the tube 5 within the casing 1. The core 8 and the ring 10 adjacent the pipe 4 being provided with radial grooves 11 and 12, respectively, to provide communication between the pipe 4 and the clearance 6.

The core 8 can be metallic or of a ceramic material or any other rigid material (polytetrafluoroethylene for example) which can be rendered externally smooth and is capable of resisting the temperature conditions of the process; the casing 1 can be metallic or of any other material capable of resisting the temperature conditions of the process and which can be plastically deformed under a difference of pressure on one side and the other of its walls of the order of about 10 kg./cm.², such deformation being necessarily prevented when this difference is of the order of 1 kg./cm.².

The process is performed in the following manner:

The tube 5 is exactly sized by external compression on a steel arbor, for example.

The dissociable metallic compound is introduced into the tube 5 in a uniform layer 13, the material being introduced by sprinkling the component into the tube by means of a mandrel correctly centred along the axis of the tube and comprising a bulbous head, the external diameter of which is slightly less than the internal diameter of the tube.

The core 8 is then introduced into the coated tube and then the assembly of the tube, the core and the sealing and positioning rings is inserted into the casing, which is then sealed by brazing the discs.

The assembly is heated to the temperature of dissociation of the compound in question and at the same time is evacuated in the clearance 6 by connecting the pipe 4 to an aspirating pump; the compound in question dissociates into a very finely sub-divided metallic powder and a volatile constituent which is removed from the casing by aspiration through the macroporous wall of the tube 5, the clearance 6, the radial grooves 11, 12 and the pipe 4.

The heating mentioned can be provided by immersing the assembly in a hot bath or by means of a source of heat (electric resistance or other kind) disposed inside the core 8 or in any other appropriate manner.

The vacuum produced in the casing 5 should be such that the partial pressure of the air is at least about $5 \times 10^3$ mm./Hg to avoid oxidation of the metallic particles during the dissociation and compression; however, if there is then introduced a non-oxidising atmosphere (hydrogen for example), it is sufficient to provide a vacuum corresponding to a partial pressure of air of the order of $3 \times 10^{-2}$ mm./Hg.

To avoid oxidation, the vacuum should be provided in, the first case, at a time no later than the thermal dissociation and in the second case, the hydrogen pressure should be provided, at a time no later than the thermal dissociation.

When the dissociation has terminated and the metallic powder is sufficiently degassed, the pipe 4 is sealed by crushing and fusion and the casing is then placed in a hydraulic compression chamber at the desired temperature to produce a coherent microporous layer of open porosity anchored to the support. This temperature is thus necessarily at a value between the ambient temperature and the temperature at which, in the conditions of the process, a closed porosity would be obtained in the layer 13 by sintering of the metallic powder.

The hydrostatic pressure of the liquid, constituted by oil for example, is exerted uniformly over all the exterior surface of the casing 1, which compresses the clearance 6 and vigorously compresses the powder between the tube 5 and the core 8.

After compression, the casing 1 is cut transversely at its two extremities in order to remove the discs 2 and 3 and the casing 1 is then divided into two half hoops, for example by cutting it longitudinally along two diametrically opposed lines.

The two half hoops are disengaged and then the core 8, which slides readily away from the hollow cylindrical barrier, is removed.

The covered support can also be removed by applying a pressure of the order of at least several kg./cm.², for example, on one of the transverse terminal surfaces of the device after having removed the discs; in this way, the coating is elastically deformed in the inverse sense to the deformation caused by the application of the hydraulic pressure previously described; the core/coated tube assembly is thus freed and the core is readily disengaged.

The casing 1 constituted for example by copper, brass or lead has a wall thickness from 0.5 to 3 mm.

The pipe 4 constituted for example by the alloy known as "Monel" has an internal diameter of 1.7 mm. and an external diameter of 3 mm.

The core 8 is steel for example, the rings 9 are polytetrafluoroethylene and the rings 10 are steel.

The casing 14 of FIG. 3 is of cylindrical form, its lower and upper extremities being of a greater section than the body, and it is provided with cylindrical plugs 15 and 16 which, during application of the hydraulic pressure, come into sealed contact with the body of the casing; this embodiment thus combines means for closing the casing and compression means of the kind in which the compression renders the sealing means more closely sealed.

The devices of FIGS. 1 to 3 have been used for the production of permeable membranes according to Examples I to III below:

*Example I*

The tube 5 to be treated, constituted by porous nickel, had a length of 12 cms., a thickness of 0.3 mm. and an exterior diameter of 14.9 mm.; the mean pore radius was 1.3 microns and its capilliary space (on the Poiseuille scale) was $2.000 \times 10^{-7}$ molecules of air per cm.² of surface per minute per cm./Hg of pressure differential between the upstream and downstream faces;

The layer 13 had a thickness of 0.05 to 1 mm. and was constituted by a paste comprising about 45 to 55% by volume of nickel formate powder and 55 to 45% by volume of a binder selected from water containing 2% by volume of gum tragacanth or an alginate, acetone containing 5% by volume of methylmethacrylate or collodion;

The dissociation was obtained by heating the assembly at 150° to 260° C., for example to 240° C., for 2 hours while providing in the clearance 6 a vacuum of $10^{-3}$ mm. Hg;

During subsequent compression, the temperature was held between 140° and 220° C. and the pressure between 2.5 and 5 t/cm.²; for example, this temperature was 150° and the pressure was 3 t/cm.²;

The mean pore radius of the microporous layer obtained was 2 centimicrons and the molecular capacity of the barrier obtained (on the Knudsen scale) was $7.00 \times 10^{-7}$ molecules of air/cm.²/minute/cm. Hg/difference of pressure between the upstream and downstream faces.

*Example II*

The tube 5 was of copper; its mean pore radius was 4 microns; the tube 5 had been coated to a thickness of 0.05 to 1 mm. with a paste comprising by volume 40 to 50% of copper oxalate and 60 to 50% of an adhesive similar to that of Example I. Dissociation was obtained at a temperature between 100° and 230° C.; degassing was then effected; it was arranged that the air pressure was lowered to $3 \times 10^{-2}$ mm. Hg and then hydrogen was introduced into the casing in order to obtain as late as possible during this dissociation a total pressure of 1 atmosphere; thereafter, by means of a pipe of the kind used to provide the preliminary vacuum, a residual pressure of about 10 mm./Hg was produced; the hydraulic compression took place between 1.5 and 3 tons/cm.² at 100 to 200° C.; for example, at a pressure of 2 tons/cm.² at a temperature of 140° C. during the compression. The mean pore radius of the microporous layer obtained was 1 centimicron and the molecular space was of the order of $400 \times 10^{-7}$ mols of air/cm.²/minute/cm.² Hg of pressure differential between the upstream and downstream faces.

*Example III*

The tube 5 was of iron, its mean pore radius being 15 microns; the coating paste was provided at a thickness of 0.05 to 1 mm. and comprised an adhesive and 55 to 65% by volume of iron carbonate; the dissociation was effected between 200° and 350° C., for example at 350° C.; the dissociation was carried out and then degassing under the same conditions as in Example II except as regards the final residual pressure which was 100 mm. Hg. The compression was effected at between 5 and 15 tons/cm.$^2$, for example at 7 tons/cm.$^2$ at between 150° and 250° C.; the microporous membrane obtained was equally permeable.

It is to be understood that not only microporous layers comprising only a single metallic constituent, but also a microporous layer comprising a plurality of metallic constituents, for example copper and nickel simultaneously, can also be manufactured; the metallic constituent of the microporous layer can also be of a different kind from the metallic constituent or constituents of the metallic support.

We claim:

1. A process for the manufacture of a permeable membrane, which comprises providing a microporous metallic support of hollow form and having a wall thickness between 0.2 and 1 mm., a mean pore radius from 1 micron to several tens of microns, with a layer on its internal face of a thickness of 0.05 to 1 mm. of a metallic compound admixed with a binder and capable of undergoing thermal dissociation into a subdivided metal having particle dimensions from 0.5 centimicron to 0.5 micron and a volatile constituent, introducing into the coated support a rigid core having a polished external surface fitting against the coated layer, introducing the assembly formed by the coated support and the core into a casing of internal form corresponding to the external form of the support with a clearance of the order of 0.02 to 1 mm. between the support and the casing, sealing the casing with the exception of at least one aperture and then, removing oxygen from said casing effecting thermal dissociation of the metallic compound, eliminating the volatile constituent evolved by aspiration towards the aperture, applying hydraulic pressure of 1 to 15 tons/cm.$^2$ to the external surface of the casing to compress the casing and the support and subdivided metal against said core, holding said casing at a temperature between the ambient temperature and the temperature of sintering of said subdivided metal while said hydraulic pressure is applied thereto thereby forming said subdivided metal support into a permeable membrane, then separating said permeable membrane from said core and casing.

2. A process according to claim 1, in which the layer on the support is constituted by a paste comprising by volume 45 to 55% of nickel formate and an adhesive, the thermal dissociation being obtained by heating to a temperature between 150° and 260° C., the hydraulic pressure being between 2.5 and 5 t/cm.$^2$ and the casing being maintained at a temperature of between 140° and 220° during said compression.

3. A process according to claim 1, in which the layer coated on the support is constituted by a paste comprising by volume 40 to 50% of copper oxalate and an adhesive, the thermal dissociation being obtained by heating to a temperature between 100° and 230° C., the hydraulic pressure being between 1.5 and 3 t/cm.$^2$ and the casing being maintained at a temperature of between 100° and 200° C.

4. A process according to claim 1, in which the layer coated on the support is constituted by a paste comprising by volume 55 to 65% of iron carbonate and a adhesive, the thermal dissociation being obtained by heating to a temperature between 200° and 350°, the hydraulic pressure being between 5 and 15 t/cm.$^2$ and the casing being maintained at a temperature of between 150° and 250° C.

5. The process defined in claim 1 wherein said step of removing oxygen comprises drawing a vacuum in said casing, of the order of $5 \times 10^{-3}$ mm./Hg.

6. The process defined in claim 1 wherein said step of removing oxygen comprises introducing a non-oxidizing atmosphere into said casing and drawing a vacuum therein of the order of $3 \times 10^{-2}$ mm./Hg.

7. A device for use in manufacturing a permeable membrane, comprising: a rigid core having a polished exterior surface; a sealed casing having side walls of heat-conductive pressure-deformable material; means supporting said core in said casing spaced from said side walls, said core and casing being so relatively shaped and dimensioned that the spacing between said exterior surface of said core and said casing is substantially uniform and of from 0.25 to 3 mm. and defines an annular space; means at the ends of said annular space for positioning therein an annular macroporous support member having a layer of a decomposable metal compound thereon; and means for aspirating gas resulting from decomposition of said compound from the interior of said casing, said casing being deformable inwardly in response to external pressure to compress said support member and layer against said core.

References Cited by the Examiner

UNITED STATES PATENTS

| | | |
|---|---|---|
| 914,679 | 3/09 | Smith. |
| 2,117,722 | 5/38 | Huggins. |
| 2,980,532 | 4/61 | Martensson et al. _____ 55—16 |
| 3,022,187 | 2/62 | Eyraud et al. _____ 55—16 |

WHITMORE A. WILTZ, *Primary Examiner.*

HYLAND BIZOT, *Examiner.*